(12) United States Patent
Demir et al.

(10) Patent No.: US 10,294,706 B2
(45) Date of Patent: May 21, 2019

(54) SLIDING DOOR STOPPER

(71) Applicant: ROLLMECH AUTOMOTIVE SANAYI VE TICARET ANONIM SIRKETI, Bursa (TR)

(72) Inventors: Erdogan Demir, Bursa (TR); Ilker Demirayak, Bursa (TR); Caner Guven, Bursa (TR); Hacer Dede, Bursa (TR); Ozgur Gedik, Bursa (TR)

(73) Assignee: ROLLMECH AUTOMOTIVE SANAYI VE TICARET ANONIM SIRKETI, Bursa (TR)

( * ) Notice: Subject to any disclaimer, the term of this patent is extended or adjusted under 35 U.S.C. 154(b) by 0 days.

(21) Appl. No.: 15/542,558

(22) PCT Filed: Sep. 6, 2016

(86) PCT No.: PCT/TR2016/050333
§ 371 (c)(1),
(2) Date: Jul. 10, 2017

(87) PCT Pub. No.: WO2017/192112
PCT Pub. Date: Nov. 9, 2017

(65) Prior Publication Data
US 2018/0216386 A1    Aug. 2, 2018

(30) Foreign Application Priority Data

Jun. 30, 2016    (TR) .............................. a 2016 09219

(51) Int. Cl.
*E05F 1/08*    (2006.01)
*E05F 5/00*    (2017.01)
(Continued)

(52) U.S. Cl.
CPC ............... *E05F 5/003* (2013.01); *B60J 5/047* (2013.01); *B60J 5/06* (2013.01); *E05F 1/16* (2013.01);
(Continued)

(58) Field of Classification Search
CPC . E05F 5/003; E05F 1/08; E05F 1/1091; E05F 1/16; E05F 3/00; E05F 3/02;
(Continued)

(56) References Cited

U.S. PATENT DOCUMENTS 5,365,636 A * 11/1994 Jensen ...................... E05F 1/16
16/67
2004/0237252 A1* 12/2004 Hoshide ................... E05F 1/16
16/72
(Continued)

FOREIGN PATENT DOCUMENTS

DE    10 2011 115 662 A1    3/2013
DE    10 2013 100 652 A1    7/2014
(Continued)

OTHER PUBLICATIONS

International Search Report and Written Opinion of the International Searching Authority for corresponding International Patent Application No. PCT/TR2016/050333 dated Mar. 17, 2017, 11 pages.

*Primary Examiner* — Chuck Y Mah
(74) *Attorney, Agent, or Firm* — Merchant & Gould P.C.

(57) ABSTRACT

The present invention relates to a door stopper (10) comprising a dampening piston (30), a pin holder (40) provided at the piston end (32) of the piston shaft (31) of the dampening piston (30), and a spring (56) connected to the pin holder (40), in order to decelerate the sliding door during opening thereof in vehicles having sliding door and in order to reduce the hitting effect. As an improvement, the present
(Continued)

invention is characterized by comprising a first roller (60) and a second roller (70) connected to each other so as to rotate together in a coaxial manner, and a first rope (61) connected to the pin holder (40) from one end and connected to the first roller (60) from the other end and a second rope (71) connected to the spring (56) from one end and connected to the second roller (70) from the other end, and further characterized in that the first roller (60) is greater than the second roller (70).

14 Claims, 3 Drawing Sheets

(51) Int. Cl.
    *E05F 5/02*     (2006.01)
    *E05F 1/16*     (2006.01)
    *B60J 5/04*     (2006.01)
    *B60J 5/06*     (2006.01)
    *F16F 13/00*     (2006.01)

(52) U.S. Cl.
CPC ............ *E05F 5/027* (2013.01); *F16F 13/007* (2013.01); *E05Y 2201/424* (2013.01); *E05Y 2201/474* (2013.01); *E05Y 2201/654* (2013.01); *E05Y 2201/668* (2013.01); *E05Y 2900/531* (2013.01); *F16F 2230/007* (2013.01); *F16F 2230/0064* (2013.01)

(58) Field of Classification Search
CPC ..... E05F 3/04; E05F 3/18; E05F 3/227; E05F 3/22; E05F 3/10; E05F 3/108; E05F 3/224; E05F 5/02; E05F 5/05; E05Y 2800/24; E05Y 2800/21; E05Y 2201/64; E05Y 2201/644; E05Y 2201/264; E05Y 2201/41; E05Y 2201/412; E05Y 2201/47; E05Y 2201/21; E05Y 2201/488; E05Y 2900/132; E05Y 2900/142; E05Y 2900/14; E05Y 2201/232; E05Y 2201/426; E05Y 2201/638; E05Y 2201/688; E05Y 2800/11; E05D 15/00; E05D 15/06; E05D 15/12; A47B 88/047; A47B 88/12; A47B 88/14; A47B 2210/0091; Y10T 16/27; Y10T 16/56; Y10T 16/61; Y10T 16/593; Y10T 16/276; Y10T 16/281; Y10T 16/379
See application file for complete search history.

(56) References Cited

U.S. PATENT DOCUMENTS

| | | | | |
|---|---|---|---|---|
| 2006/0016279 A1* | 1/2006 | Sato | ........................ | E05F 1/16 74/89.17 |
| 2010/0007254 A1* | 1/2010 | Zimmer | .................... | E05F 1/16 312/333 |
| 2010/0123378 A1* | 5/2010 | Chen | .................... | A47B 88/467 312/333 |
| 2011/0080080 A1* | 4/2011 | Zimmer | ............... | A47B 88/467 312/319.1 |
| 2013/0014343 A1* | 1/2013 | Tanno | ........................ | E05F 1/16 16/49 |
| 2013/0019432 A1* | 1/2013 | Smith | ........................ | E05F 1/16 16/49 |
| 2013/0019438 A1* | 1/2013 | Tanno | ........................ | E05F 1/16 16/94 R |
| 2013/0076219 A1* | 3/2013 | Lam | ........................ | A47B 88/14 312/319.1 |
| 2013/0133157 A1* | 5/2013 | Kimura | .................... | E05F 3/00 16/49 |
| 2013/0182978 A1* | 7/2013 | Huang | .................... | E05F 5/003 384/21 |
| 2013/0219657 A1* | 8/2013 | Iwaki | ........................ | E05F 1/16 16/64 |
| 2014/0026357 A1* | 1/2014 | Zimmer | .................... | E05F 1/16 16/72 |
| 2016/0333622 A1* | 11/2016 | Glogowski | .............. | E05F 5/003 |
| 2016/0340955 A1* | 11/2016 | Zimmer | .................... | E05F 5/003 |
| 2017/0130501 A1* | 5/2017 | Svara | ........................ | E05F 5/003 |

FOREIGN PATENT DOCUMENTS

| | | | | |
|---|---|---|---|---|
| EP | 1 961 332 A1 | | 8/2008 | |
| JP | 2008223456 A | * | 9/2008 | .............. E05F 3/108 |
| KR | 101180141 B1 | * | 9/2012 | |
| NL | 1008526 C1 | * | 9/1999 | .............. E05F 3/108 |

\* cited by examiner

SLIDING DOOR STOPPER

This application is a National Stage Application of PCT/TR2016/050333, filed 6 Sep. 2016, which claims benefit of Serial No. 2016/09219, filed 30 Jun. 2016 in Turkey, and which applications are incorporated herein by reference. To the extent appropriate, a claim of priority is made to each of the above disclosed applications.

TECHNICAL FIELD

The present invention relates to a sliding door system used in vehicles, particularly used in commercial and passenger vehicles.

PRIOR ART

Door stoppers known in the present art provide the sliding doors, used in pluralities of sectors, to stay in the open position.

At the present time, various door stoppers are used. There are leaf spring systems, twist spring systems and press spring systems, and moreover, there are door stoppers made of plastic. These stoppers use bending properties of plastics as spring. The common characteristic of all these systems is that they fulfill their functions by using a single spring.

The momentum/force tolerance range in the production of said springs is 7.5-10%. This tolerance range leads to 15-20% change in the force/momentum exerted by the spring to the door stopper. Thus, due to the spring comprised by the door stopper, the force exerted to the sliding door systems cannot provide the same values in every production, it cannot be stable.

In the present system, since the door stoppers have a single spring and since there is no adjustability thereon, it is not possible to adjust the opening and closing efforts of said door stoppers.

In the present art, as a result of hitting of the doors, which amount up to 63 kg, to the wedges with 60~80 shore hardness in the range of 0.5~2 mm for the momentum obtained in the movement of the doors up to 1.4 meters, the following problems occur, Tearing, crushing in the wedges, and removal from the place thereof as a result of tearing of the connection element Deformation of the guide whereon the mechanism moves and falling of the door as a result of removal from the place thereof in case of severe deformations In cases where the wedges are provided on the door, deformation of the body sheet by means of hitting by the wedge and leading to visual faults Deformation of the mechanism and increasing the usage/movement efforts of the door and leading to function loss at a level which can be sensed by the customer Reinforcement for preventing deformation of the body (thickness increase, addition of sheet brackets for providing extra support, . . . ) and increasing the weight of the vehicle due to this reinforcement In order to prevent deformation of the mechanism and guides, making them more resistant and as a result of this, weight increase and increase of the process costs.

Besides, in the known state of the art, since there is no adjustability on the door stoppers or there is limitation on the adjustability, the following problems occur:

It does not meet the expectations of the customer requesting the product.

Since the opening and closing efforts move in a connected manner with each other, the inclusion of the opening and closing efforts within the customer expectations takes long time.

Due to the production tolerances, the dimensions of some pieces cannot be adjusted and these pieces lead to a scrap cost.

It leads to inefficiency in production, and labor time extends.

In order to sustain mass production, additional labor and/or additional equipment investment is/are needed.

If 100% force control is not made in the production lines, the products, exiting the line, may lead to injuries of the automobile users.

As a result, because of all of the abovementioned problems, an improvement is required in the related technical field.

BRIEF DESCRIPTION OF THE INVENTION

The present invention relates to a door stopper, for eliminating the above mentioned disadvantages and for bringing new advantages to the related technical field.

The main object of the present invention is to provide a door stopper where the force needed for closing the sliding door is reduced and where opening of the sliding door with the desired level is provided.

In order to realize all of the abovementioned objects and the objects which are to be deducted from the detailed description below, the present invention is a door stopper comprising a dampening piston, a pin holder provided at the piston end of the piston shaft of the dampening piston, and a spring connected to the pin holder, in order to decelerate the sliding door during opening thereof in vehicles having sliding door and in order to reduce the hitting effect. Accordingly, the present invention comprises a first roller and a second roller connected to each other so as to rotate together in a coaxial manner, and a first rope connected to the pin holder from one end and connected to the first roller from the other end and a second rope connected to the spring from one end and connected to the second roller from the other end, and the first roller is greater than the second roller. Thus, when the spring is selected to be strong in a manner bringing the door to the open position, the force, to be exerted by the user to the spring for closing the door, is brought to ergonomic values.

In a preferred embodiment of the subject matter invention, there is a spring chamber wherein the spring is positioned.

In a preferred embodiment of the subject matter invention, the spring chamber comprises at least one chamber wall whereon an end of the spring is stopped.

In a preferred embodiment of the subject matter invention, there is at least one spring guide which passes through the spring and through the gap provided on the chamber wall and which extends towards the second roller.

In a preferred embodiment of the subject matter invention, the spring guide comprises a guide head whereon an end of the spring is stopped.

In a preferred embodiment of the subject matter invention, the second rope is connected from one end thereof and the second roller is connected from the other end thereof to the end of the spring guide existing outside of the spring chamber.

In a preferred embodiment of the subject matter invention, the spring chamber comprises a cover which exerts pressure on the spring guide.

In a preferred embodiment of the subject matter invention, at least one holder guide pin is provided on the pin holder, and a holder movement channel, wherein the guide pin is at least partially placed, is provided on a body of the door stopper.

In a preferred embodiment of the subject matter invention, the holder movement channel extends in the extension direction of the piston shaft.

In a preferred embodiment of the subject matter invention, there is a curved part provided at the end of the holder movement channel which is close to the dampening piston.

In a preferred embodiment of the subject matter invention, there is a second holder guide pin entering into the curved part when the pin holder is substantially approached to the dampening piston.

In a preferred embodiment of the subject matter invention, the pin holder comprises at least one holder guide channel wherein the piston end of the dampening piston is placed.

In a preferred embodiment of the subject matter invention, the holder guide channel is provided in a curved form.

In a preferred embodiment of the subject matter invention, the second roller is provided in a circular form.

In a preferred embodiment of the subject matter invention, the second roller is provided in a cam form.

REFERENCE NUMBERS

Figure 1A:
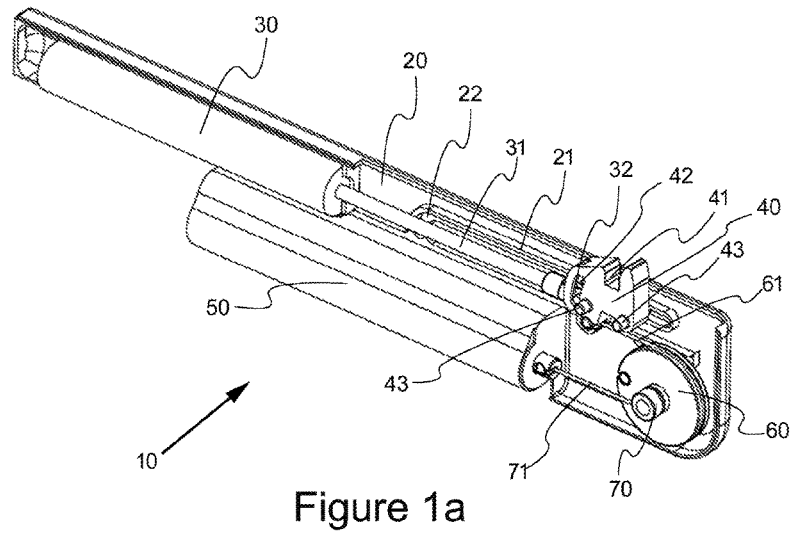
FIG. 1a is a representative isometric view of the subject matter door stopper.

10 Door stopper
20 Body
21 Holder movement channel
22 Curved part
30 Dampening piston
31 Piston shaft
32 Piston end
40 Pin holder
41 Door pin housing
42 Holder guide channel
43 Holder guide pin
50 Spring chamber
51 Chamber wall
52 Gap
53 Cover
54 Spring guide
55 Guide head
56 Spring
60 First roller
61 First rope
70 Second roller
71 Second rope
a Center axis
R1 First roller radius
R2 Second roller radius

THE DETAILED DESCRIPTION OF THE INVENTION

In this detailed description, the subject matter door stopper (10) is explained with references to examples without forming any restrictive effect only in order to make the subject more understandable.

The subject matter door stopper (10) essentially has a body (20), a dampening piston (30) positioned inside said body (20), and a pin holder (40) which can catch a door pin positioned at the piston shaft (31) end of the dampening piston (30) and provided on the sliding door.

Figure 1B:
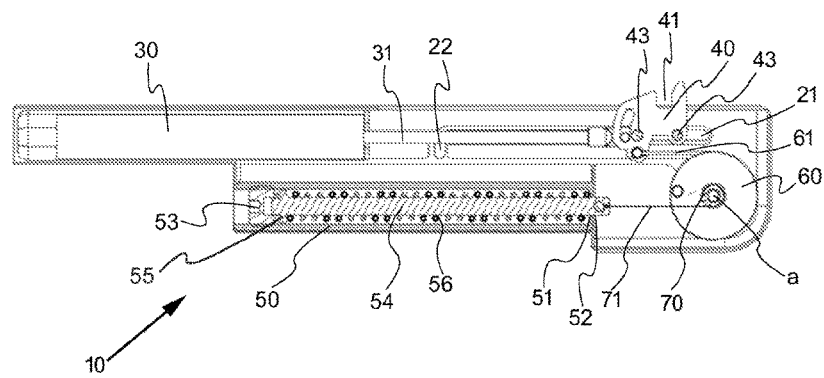
FIG. 1b is a representative detailed view of the subject matter door stopper.

As can be seen in FIG. 1, the dampening piston (30) is fixed inside the body (20). There is a pin holder (40) provided in a piston end (32) of the piston shaft (31) extending outwardly through the dampening piston (30). The piston end (32) is positioned inside a holder guide channel (42) provided on the pin holder (40). The holder guide channel (42) is preferably provided in a curved form. There are two holder guide pins (43) provided on the pin holder (40). The holder guide pin (43) is placed to a holder movement channel (21) provided on the body (20). Thus, while piston shaft (31) enters into and exits the dampening piston (30), the pin holder (40) moves in the direction of the holder movement channel (21). Since the holder movement channel (21) has a curved part (22) provided in a curved form at an end thereof and since the piston end (32) is positioned in the holder guide channel (32), when one of the holder guide pins (43) reaches the curved part (22) of the holder movement channel (21), the pin holder (40) can make a rotational movement at the other holder guide pin (43) axis. A door pin housing (41) is provided in recess form on the pin holder (40). During the opening and closing of the sliding door, the door pin can enter into and exit the pin housing (41). Thanks to said rotation freedom of the pin holder (40), the entering and exiting of the door pin into the pin housing (41) are facilitated.

There is a first roller (60) and a second roller (70) provided on the body (20). The first roller (60) and the second roller (70) are connected to the body (20) in a concentric manner and in a manner having rotation freedom at the center axis (a). The first roller (60) and the second roller (70) are connected to each other in a manner rotating together. Moreover, the first roller (60) is greater than the second roller (70). There is a first rope (61) connected to the first roller (60) from one end and connected to the pin holder (40) from the other end. The first rope (61) partially wraps onto the first roller (60).

There is a spring (56) provided on the body (20). The spring (56) is positioned inside a spring chamber (50). The spring (56) stops onto a chamber wall (51) of the spring chamber (50) from one side. The spring (56) stops onto a guide head (55) of a spring guide (54) which passes through the spring (56) from the other side and which extends towards the chamber wall (51). In other words, there is a spring guide (54) positioned inside the spring chamber (50), and the spring guide (54) extends through the spring (56) stopped onto the guide head (55) of the spring guide (54) from one end and stopped onto the chamber wall (51) from the other side. One end of the spring guide (54) passes through a gap (52) provided on the chamber wall (51) and it extends outwardly. The other end of the spring chamber (50) is closed by a cover (53). At the same time, the cover (53) is in contact with the spring guide (54), and thus, the first position of the spring guide (54) is determined by means of the cover (53). In other words, the cover (53) presses the spring guide (54) at a predetermined amount and it provides a pre-loading to the spring (56). There is a second rope (71) connected to the spring guide (54) from one end and connected to the second roller (70) from the other end. The second rope (71) is at least partially wrapped onto the second roller (70). The second rope (71) is connected to the spring guide (54) from the end of the spring guide (54) extending outwards the spring chamber (50).

In a possible embodiment of the present invention, the first roller (60) and the second roller (70) are provided in circular form and in a concentric manner.

Figure 2A:
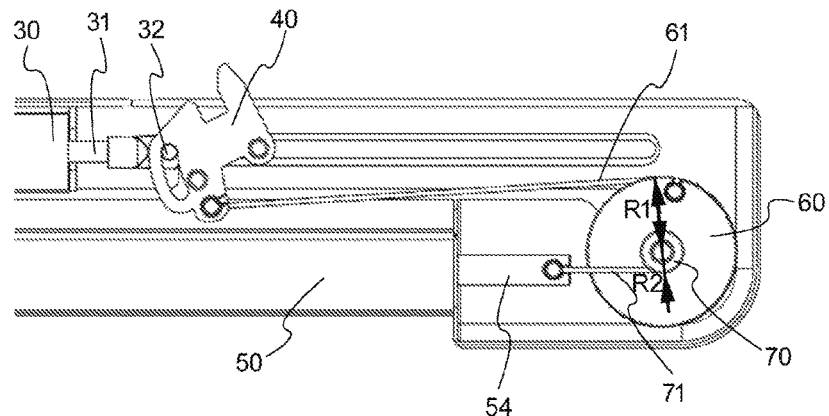
FIG. 2a is a representative detailed view of the subject matter door stopper while the sliding door is in closed position.
Figure 2B:
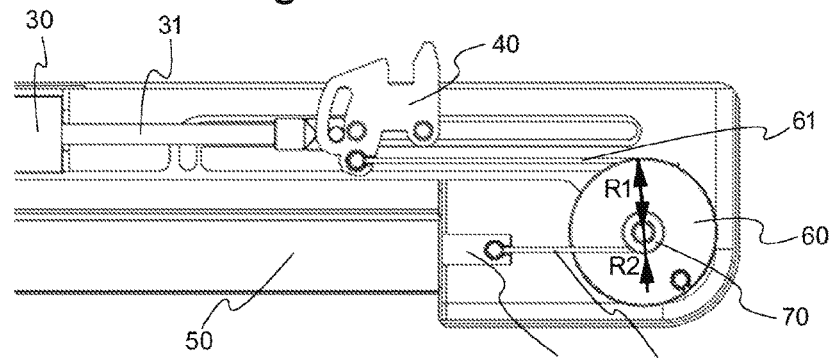
FIG. 2b is a representative detailed view of the subject matter door stopper in passage position while the sliding door is being opened.
Figure 2C:
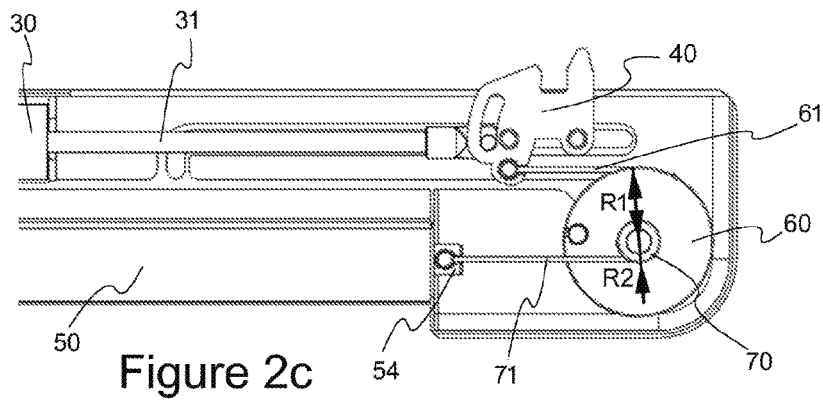
FIG. 2c is a representative detailed view of the subject matter door stopper while the sliding door is in open position.

In FIG. 2a, the view of the subject matter door holder (10) in the closed position of the door is given. In this position, the door does not contact the door holder (10). Moreover, in this position, since one of the holder guide pins (43) is provided at the curved part (22) of the holder movement channel (21), the door pin housing (41) is stopped in a manner facing the coming direction of the door. While the user opens the door, when the end of the door opening action is reached, the door pin, provided on the door, is placed to the door pin housing (41) provided on the pin holder (40). The door begins pushing the pin holder (40) by means of the speed thereof resulting from the door movement, and it provides the piston shaft (31) to be drawn outwards the dampening piston (30). Thus, the kinetic energy, stored on the door, is absorbed by the shock dampening piston (30), and the speed of the door is reduced. During this movement, the first roller (60) and the second roller (70) rotate by means of the spring force of the spring (56). By means of this, while the second rope (71) wrapped on the second roller (70) is being unwrapped, the first rope (61) is wrapped onto the first roller (60). Before the door reaches the completely open position, when the speed of the door approaches a value which is insufficiently low in a manner that the door does not reach a completely open position, the pin holder (40) continues to be drawn by means of the spring force. Thus, the door continues its opening movement, and the door reaches the door open position illustrated in FIG. 2c from the passage position given in FIG. 2b. When the door reaches the open position, thanks to the drawing force exerted on the pin holder (40) by the spring (56), the door continues to stay open. When the door is desired to be closed, by means of the force exerted by the user, the spring force is overcome, and the pin holder (40) is pushed towards the dampening piston (30). When the pin holder (40) sufficiently approaches the dampening piston (30), one of the holder guide pins (43) enters into the curved part (22) of the holder movement channel (21). By means of this, the pin holder (40) slightly rotates, and the door pin exits the door pin housing (41). During the movement of the pin holder (40) towards the dampening piston (30), the spring (56) is compressed, and the spring (56) is loaded with energy for being used during the next opening. By means of the placement of the holder guide pin (43) to the curved part (22), the pin holder (40) is mechanically locked, and thus, it waits in a ready-to-use manner by means of the energy loaded on the spring (56).

In said embodiment, in order to bring the door to the open position, the spring force shall be sufficiently great. However, if the spring force is great, the amount of energy to be consumed for loading the spring (56) while the door is being closed is greater.

In more details;

The radius of the first roller (60) is defined as R1,

The radius of the second roller (70) is defined as R2,

The force exerted by the user while the door is being closed and transferred to the first roller (60) by the first rope (61) by means of the pin holder (40) is defined as F1, The force exerted by the spring (56) and by the second rope (71) to the second roller (70) is defined as F2. Accordingly, in order to load the spring (56) by means of closing the door, F1*R1 shall be greater than F2*R2. Thus, if the R1/R2 proportion is greater, a smaller F1 force is needed. By means of this, when the spring (56) is selected to be strong in a manner bringing the door to the open position, the force, exerted to the spring (56) by the user for closing the door, is brought to ergonomic values.

On the other hand, in case the first roller (60) and the second roller (70) are in the same dimension, during loading of the spring (56), the displacement amount of the pin holder (40) and the change amount to occur in the length of the spring (56) are equal. However, in case the first roller (60) is greater than the second roller (70), the change which has to occur in the length of the spring (56) depending on the radiuses of the roller is reduced. By means of this, the change of the force to be exerted during loading of the spring (56) is reduced. This provides the sliding door to be drawn by the spring (56) even at specific surface inclination values. The operation of the sliding door at inclined surfaces is only needed in the automotive sector. Moreover, the radius difference between the first roller (60) and the second roller (70) provides loading of the spring (56) with a shorter length change.

Figure 3A:
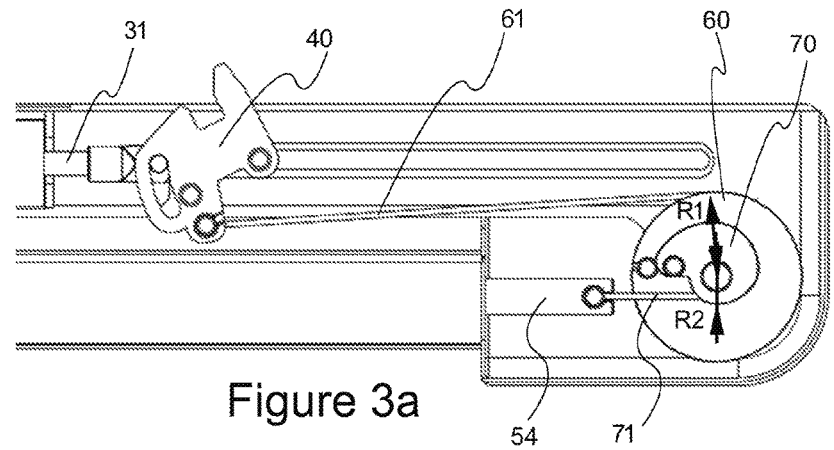
FIG. 3a is a representative detailed view of an alternative embodiment of the subject matter door stopper while the sliding door is in closed position.
Figure 3B:
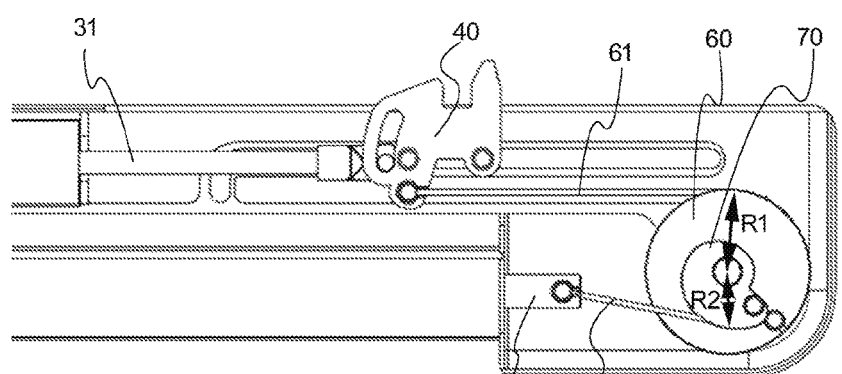
FIG. 3b is a representative detailed view of an alternative embodiment of the subject matter door stopper while the sliding door is being opened.
Figure 3C:
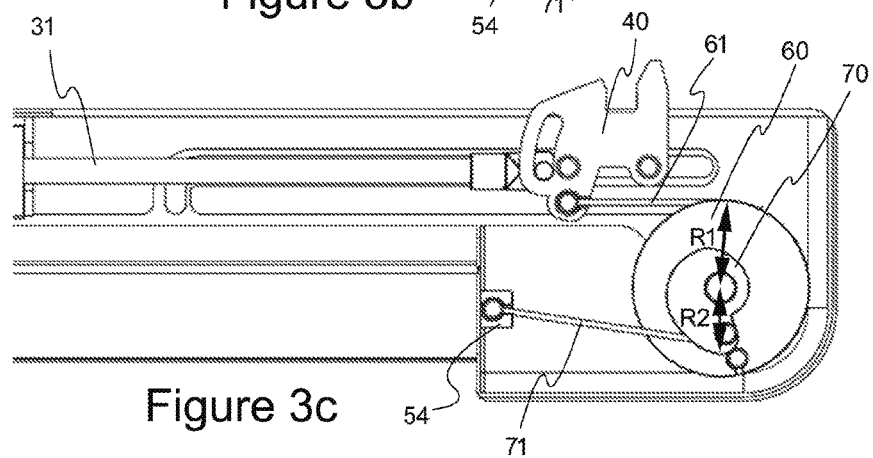
FIG. 3c is a representative detailed view of an alternative embodiment of the subject matter door stopper while the sliding door is in open position.

In another embodiment of the present invention illustrated in FIGS. 3a, 3b and 3c, the first roller (60) is provided in a circular form, and the second roller (70) is provided in a cam form. Accordingly, the diameter of the second roller (70) is provided to be variable. By means of this, R1/R2 proportion changes depending on the position of the pin holder (40) and depending on the rotation amount of the first roller (60) and the second roller (70). In FIG. 3a, in the closed position of the door, the R2 value is the lowest. While the door is being opened, and as the pin holder (40) displaces, R2 increases. Thus, the effect of the spring force increases, and the passage of the door to the open position is facilitated. By means of this, the opening of the door can be provided by means of a lower-resistance spring (56). Moreover, depending on the operational character of the springs (56), the effect of the decrease, occurring in spring force, on the door movement is eliminated.

The protection scope of the present invention is set forth in the annexed Claims and cannot be restricted to the illustrative disclosures given above, under the detailed description. It is because a person skilled in the relevant art can obviously produce similar embodiments under the light of the foregoing disclosures, without departing from the main principles of the present invention.

The invention claimed is:

1. A door stopper comprising:
a body of the door stopper, said body including:
a dampening piston;

a pin holder pivotally connected to a piston end of a piston shaft of the dampening piston and adapted to catch a door pin of a sliding door;

a first roller;

a second roller connected to the first roller, wherein the first roller and the second roller are configured to rotate together in a coaxial manner, and wherein the second roller is smaller than the first roller;

a first rope connected to the pin holder from one end of the first rope and connected to the first roller from the other end of the first rope; and a second rope connected to a spring from one end of the second rope and connected to the second roller from the other end of the second rope.

2. A door stopper according to claim 1, wherein the door stopper comprises a spring chamber wherein the spring is positioned.

3. A door stopper according to claim 2, wherein the spring chamber comprises at least one chamber wall whereon an end of the spring is stopped.

4. A door stopper according to claim 3, wherein the spring comprises at least one spring guide which passes through coils of the spring and through an opening provided on the chamber wall, and said spring guide is connected to said one end of the second rope.

5. A door stopper according to claim 4, wherein the spring guide comprises a guide head whereon another end of the spring is stopped.

6. A door stopper according to claim 5, wherein the spring chamber comprises a cover which exerts pressure on the spring guide.

7. A door stopper according to claim 1, further comprising:

at least one holder guide pin provided on the pin holder; and said body having a holder movement channel in which the at least one holder guide pin is at least partially placed for sliding movement.

8. A door stopper according to claim 7, wherein the holder movement channel extends in the extension direction of the piston shaft.

9. A door stopper according to claim 8, wherein the door stopper comprises a curved part provided at the end of the holder movement channel which is close to the dampening piston.

10. A door stopper according to claim 9, wherein said at least one holder guide pin comprises a second holder guide pin entering into the curved part when the pin holder is substantially approached to the dampening piston.

11. A door stopper according to claim 1, wherein the pin holder comprises at least one holder guide channel wherein the piston end of the dampening piston is placed.

12. A door stopper according to claim 11, wherein the holder guide channel is provided in a curved form.

13. A door stopper according to claim 1, wherein the second roller is provided in a circular form.

14. A door stopper according to claim 1, wherein the second roller is provided in a cam form.

* * * * *